Figure 1:
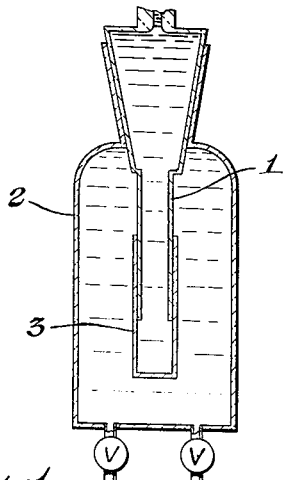

Oct. 5, 1965   R. A. CRANE ETAL   3,210,159
APPARATUS FOR MEASURING PHYSICAL CHANGES AND
PROGRESS OF LIQUID CHEMICAL REACTIONS
Filed April 11, 1960

INVENTORS.
Robert A. Crane
BY John F. Voeks

Griswold & Burdick
ATTORNEYS

United States Patent Office 3,210,159
Patented Oct. 5, 1965

3,210,159
APPARATUS FOR MEASURING PHYSICAL CHANGES AND PROGRESS OF LIQUID CHEMICAL REACTIONS
Robert A. Crane and John F. Voeks, Concord, Calif., assignors to The Dow Chemical Company, Midland, Mich., a corporation of Delaware
Filed Apr. 11, 1960, Ser. No. 21,442
5 Claims. (Cl. 23—252)

This invention relates to an apparatus for the measurement of physical changes of liquid materials and a method of measuring the progress of chemical reactions by said apparatus.

One well-known practice of measuring physical changes of solid or fluid materials is the practice of dilatometry. Specifically, the fluid bulb-and-stem thermometer is a classic example of a dilatometer in essence. In a fluid bulb-and-stem thermometer, the expansion and contraction of a fluid body under the influence of temperature is translated into rectilinear motion suitable for quantitative observation.

Study of physical change is of interest because the change is indicatve of a causal phenomenon. For example, in a fluid-filled thermometer or in elongation of a solid sample, the causation is a change of temperature.

This invention concerns the consideration of changes of volume in fluid systems as a measurement of the progress of chemical reaction. For example, "condensation" reactions wherein the molecules of products are fewer than the molecules of reactants are generally associated with a net reduction of volume of the reacting system.

Extensive studies have been conducted to utilize the physical changes in the investigation of polymerization reactions. The extent of combination of monomer molecules into polymers may be determined by careful observation of the decrease of the system volume. Since the relative dimensional changes may be the order of less than one percent of the system volume, precision and sensitivity are prime requisites of the observation of the dimensional changes.

Many polymerization systems place serious practical difficulties in the determination of precise measurements. For example, the monomers, solvents, and catalysts used are commonly very reactive and combine with the materials of construction of measuring instruments. For example, acrylonitrile solutions in concentrated aqueous saline solvents cannot be allowed to contact many metals, plastics, rubber, or cork. If the reactant materials do react with the construction materials, interfering side reactions will obviously confuse the observation of the main reaction under interest. Other difficulties include the high viscosity of many solutions and, thus, inhibit uniform fluid flow and pressure transmission. This difficulty with viscosity is especially important in systems utilizing narrow orifices.

A primary object of this invention is to provide an instrument for the measurement of phyical changes associated with liquid chemical reactions. Another object is to provide such an instrument which exhibits a high degree of sensitivity and precision and freedom from chemical interference with reactive compounds. Still another object is to provide a convenient and dependable device adaptable to automatic and continuous recording of dimensional changes in fluid systems. Further objects include the measurement of the progress of chemical reactions by the aforesaid instrument. Other objects will become apparent hereinafter.

The above objects will be accomplished in accordance with our invention by the provision of an apparatus comprising a hollow open-ended, inert, tube affixed to and protruding into a reaction vessel which is to be completely filled with the reactants, a freely movable, close-fitting inert cylindrical member having one open end and one blind end being concentric to said fixed tube, said cylinder being placed through its open end on said fixed tube and being slidable in relation to and bearing on said fixed tube, the blind end of said cylinder serving as a movable piston extending below the bottom of the hollow open-ended tube and being immersed into the liquid contents of the vessel and thereby providing sealing means between the instant apparatus and said vessel contents, the open top end of said cylindrical member being positioned below the top of said hollow open-ended tube, and sensing means for measuring the translational movement of the movable piston and transmitting said movement beyond the confines of the fixed cylinder and reaction vessel assembly.

Figure 2:
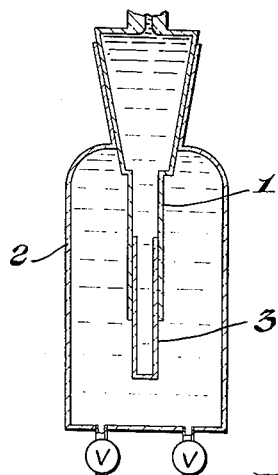
Figure 3:
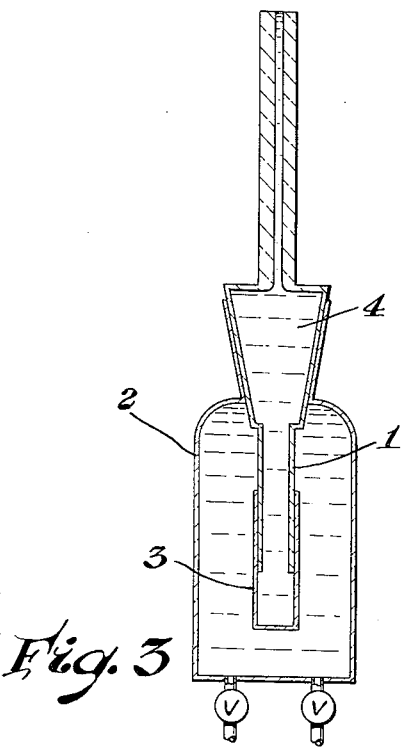
Figure 4:
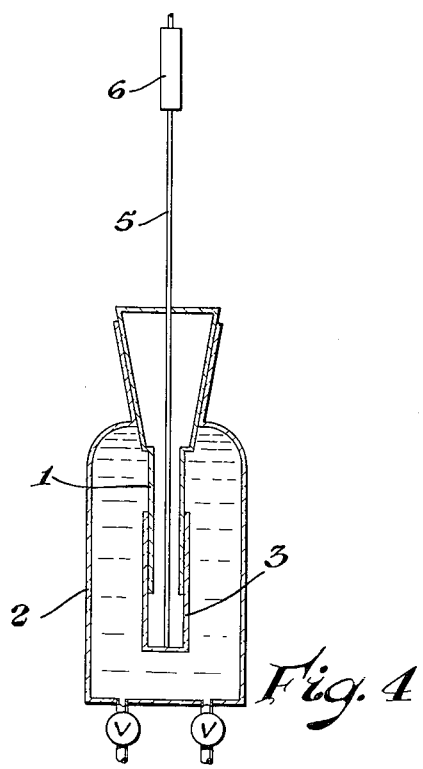

The invention will be more readily appreciated by reference to the attached drawing in which FIGURES 1 and 2 show the apparatus of the present invention, and FIGURES 3 and 4 show said apparatus with measuring means.

The apparatus in its essence is illustrated in FIGURE 1, wherein the vertical hollow open-ended tube 1 is frusto-conical shaped at its upper end and is concentrically affixed to and protrudes into the reaction vessel 2, the close-fitting cylinder with the blind end piston 3, thereinafter referred to simply as the piston, slidably engages the exterior of the aforesaid tube and is immersed into the reactants of the reaction vessel 2 so that vertical movement of the piston 3 measures decrease or increase in volume of the liquid reaction mixture. The reaction vessel 2 is provided with valves V at its bottom to permit introduction of the reactants and/or purging the apparatus.

The apparatus represented in FIGURE 2 differs from the apparatus in FIGURE 1 in that the cylinder with its one blind end, i.e. the piston 3 is designed such that the external wall of the cylinder slidably engages the interior surface of the open-ended hollow tube 1.

The sensing means to be used in conjunction with the apparatus of the present invention may be of several types. FIGURE 3 sets forth a liquid type and FIGURE 4 shows an electromechanical type.

In FIGURE 3, the open-ended hollow cylinder 1 is filled with a liquid 4, hereinafter referred to as the "sensing fluid," which is held within the said cylinder 1 and prohibited from entering the reactant vessel 2 by the piston 3. The changes in volume of the reactants causes a rising or falling of the piston 3 which in turn causes a corresponding movement of the sensing fluid 4. This movement of the sensing fluid 4 may be observed at the upper end of the open-ended hollow cylinder 1 which may be constructed in the form of a calibrated capillary.

Although the use of the piston 3 in the apparatus as illustrated in FIGURE 3 is not necessary, the practice of using a sensing fluid in contact with the fluid to be measured, hereinafter called the "working fluid," is to be avoided since it is impractical in highly chemically reactive systems. Then too, the use of an apparatus without the piston 3 and with the sensing fluid 4 being the fluid whose movement is measured, that is, the working fluid, is quite impractical in viscous systems where flow resistance is high.

FIGURE 4 illustrates the apparatus of the present invention without the use of a sensing fluid. The apparatus is shown with the piston 3 equipped with a rod 5 and adapted with a differential transformer core 6 so that an electrical signal may be detected and, if desired, be further equipped with conventional additional means for automatic recording (not shown).

The materials of construction of the present invention are those materials which are inert to the chemical reactants under observation. Some such materials are glass, certain suitable plastic compositions and the like. Although the entire apparatus need not be completely constructed of inert materials, the piston 3 and the open-ended tube 1 which are to be immersed into the chemical reactants should be constructed of an inert material.

The engaging surfaces between the open-ended tube 1 and the close-fitting piston 3 are lubricated with a material which is inert to the chemical reactants employed. Satisfactory results were obtained with a poly(chlorotrifluoroethylene) grease.

The method of measuring the progress of liquid chemical reactions during which a mass of liquid chemical reactants undergo volume changes comprises utilizing the apparatus of the present invention with an appropriate calibration of the sensing means.

The following examples are given to illustrate the present invention but are not to be construed as limiting the invention thereto.

*Example I*

A reaction vessel was prepared comprising a glass flask to which was adapted at the neck of said flask an open-ended glass tube, said glass tube sealing the flask by means of ground glass joints, the said glass tube protruding downward into the flask and fitted at its lower end with a piston of glass or other material inert to the reactants and products being measured, said piston slidably engaging and bearing on the open-ended tube and immersed into the chemical reactants. The uppermost end of the glass tube was drawn into a capillary which had been calibrated against a standard and filled with mercury. The apparatus was similar to that shown in FIGURE 3.

The reaction vessel was completely filled with a solution of acrylonitrile monomer, solvent and suitable polymerization initiator. Heat was applied by placing the reaction vessel in a constant temperature bath. As the reaction mixture was heated, the acrylonitrile expanded causing a rise in the sensing fluid, then as the polymerization progressed, the sensing liquid level dropped denoting a decrease in volume which was readily observed. At a point predetermined and calibrated on the capillary indicating polymerization was complete, the reaction vessel was withdrawn from the bath. In this manner it was possible to exactly duplicate in batchwise operation, various reaction procedures.

*Example II*

An apparatus was constructed and charged with acrylonitrile polymerization mixture as outlined in Example I. The sensing means of the apparatus differed in that the piston was connected to a nickel rod by an epoxy resinous material, the said connecting rod protruded up through the open-ended tube and was equipped with a differential transformer core thus providing for the conversion of linear displacement into a measurable electrical signal.

The rate of reaction of other liquid chemical reactions may be conducted in a manner similar to that described for the foregoing examples with the apparatus of the present invention.

Various modifications may be made in the present invention without departing from the spirit and scope thereof and it is to be understood that we limit ourselves only as defined in the appended claims.

We claim:

1. An instrument for measuring physical changes in volume of a liquid mass undergoing chemical reaction which comprises: a vertical open-ended tube affixed to and protruding into a reaction vessel containing a liquid mass which exhibits a volume change upon undergoing chemical reaction, a cylindrical member having one open end and one blind end concentric to said open-ended tube, said cylindrical member being slidable in relation to and bearing on said vertical open-ended tube, the blind bottom end of said cylindrical member extending below the bottom of said vertical open-ended tube and serving as a movable piston and providing sealing means between the open-ended tube and the liquid contents of said reaction vessel, the open top end of said cylindrical member being positioned below the top of said vertically open-ended tube said movable piston responding to volume changes during reaction of the liquid contents of said reaction vessel, and, means for measuring the relative position of said blind cylinder with respect to its position on said fixed open-ended tube thereby noting the volume changes of said liquid contents of said reaction vessel.

2. The instrument for measuring physical changes of reacting liquids as defined in claim 1 wherein the vertically positioned open-ended tube is frusto-conical shaped at its upper end and is concentrically affixed at the neck of the reaction vessel.

3. The instrument for measuring physical changes of a reacting liquid as defined in claim 1 wherein the exterior wall of the cylinder having one blind end slidably engages the interior of the fixed tube.

4. The instrument for measuring physical changes of a reacting liquid as defined in claim 1 wherein the interior wall of the cylinder having one blind end slidably engages the exterior of the fixed tube.

5. The instrument for measuring physical changes as defined in claim 4 wherein the blind ended cylinder is fitted with a rod, said rod extending upward through the interior of the cylinder having one of its ends attached to the blind end of said cylinder opposite that contacting the liquid in the reaction vessel and the other end adapted with a differential transformer core.

References Cited by the Examiner

UNITED STATES PATENTS

| 464,543 | 12/91 | Wolpert | 23—254 |
| 2,105,000 | 1/38 | Meyer | 73—409 |
| 2,913,316 | 11/59 | Rice | 23—256 |

FOREIGN PATENTS

| 717,456 | 2/42 | Germany. |

MORRIS O. WOLK, *Primary Examiner.*

MAURICE A. BRINDISI, JAMES H. TAYMAN, Jr.,
*Examiners.*